United States Patent
Kunitomo

(10) Patent No.: US 12,365,621 B2
(45) Date of Patent: Jul. 22, 2025

(54) GLASS DIRECT ROVING PRODUCTION METHOD AND GLASS DIRECT ROVING

(71) Applicant: NIPPON ELECTRIC GLASS CO., LTD., Otsu (JP)

(72) Inventor: Akira Kunitomo, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 514 days.

(21) Appl. No.: 17/630,979

(22) PCT Filed: Jul. 16, 2020

(86) PCT No.: PCT/JP2020/027629
§ 371 (c)(1),
(2) Date: Jan. 28, 2022

(87) PCT Pub. No.: WO2021/075109
PCT Pub. Date: Apr. 22, 2021

(65) Prior Publication Data
US 2022/0298066 A1 Sep. 22, 2022

(30) Foreign Application Priority Data
Oct. 17, 2019 (JP) .................................. 2019-189895

(51) Int. Cl.
*C03C 25/36* (2006.01)
*C03C 25/64* (2006.01)

(52) U.S. Cl.
CPC .............. *C03C 25/36* (2013.01); *C03C 25/64* (2013.01)

(58) Field of Classification Search
CPC .. C03C 25/36; C03C 25/10–36; D06M 15/55; D06M 15/65; D06M 15/273; D06M 13/385; D06M 13/11; C08G 59/18–72
(Continued)

(56) References Cited

U.S. PATENT DOCUMENTS 3,384,505 A * 5/1968 Palmer ................... B29B 15/10
427/386
5,086,101 A 2/1992 Garrett et al.
(Continued)

FOREIGN PATENT DOCUMENTS

CN 1058223 A 1/1992
CN 1449983 A 10/2003
(Continued)

OTHER PUBLICATIONS

Chanda, Manas. (2018). <i>Plastics Technology Handbook (5th Edition)—1.2.4 Polydispersity Index.</i> (pp. 12). Taylor & Francis. Retrieved from <br>https://app.knovel.com/hotlink/pdf/id:kt011GSNK2/plastics-technology-handbook/polydispersity-index (Year: 2018).*

(Continued)

*Primary Examiner* — Larissa Rowe Emrich
(74) *Attorney, Agent, or Firm* — Keating & Bennett, LLP

(57) ABSTRACT

Provided is a method for producing a glass direct roving that has excellent workability and can effectively increase the mechanical strength of a composite material obtained by combination with resin. A method for producing a glass direct roving 10 formed by directly winding up a bundle of glass filaments includes the steps of: applying a sizing agent containing an epoxy resin having an epoxy equivalent of 180 to 240 to surfaces of a plurality of glass filaments to bundle the plurality of glass filaments; winding up a bundle obtained by bundling the plurality of glass filaments, thus making a wound package; and thermally drying the sizing agent at a temperature of 135° C. to 155° C. to form a coating on the surfaces of the glass filaments.

2 Claims, 1 Drawing Sheet

(58) Field of Classification Search
USPC .................................................. 528/87–124
See application file for complete search history.

(56) References Cited

U.S. PATENT DOCUMENTS

| | | | |
|---|---|---|---|
| 2005/0279140 | A1 | 12/2005 | Adzima et al. |
| 2006/0036003 | A1 | 2/2006 | Adzima et al. |
| 2006/0083916 | A1 | 4/2006 | Renaudin et al. |
| 2006/0204763 | A1 | 9/2006 | Hartman et al. |
| 2007/0204948 | A1 | 9/2007 | Gauchel et al. |
| 2011/0033702 | A1* | 2/2011 | Serrughetti ............. C03C 25/26 106/205.1 |
| 2011/0047768 | A1 | 3/2011 | Huff et al. |
| 2015/0284289 | A1* | 10/2015 | Gu ........................ C08G 71/04 524/199 |
| 2016/0160563 | A1 | 6/2016 | Gauchel et al. |
| 2018/0290922 | A1* | 10/2018 | Abayasinghe .......... C03C 13/00 |

FOREIGN PATENT DOCUMENTS

| | | |
|---|---|---|
| CN | 101100356 A | 1/2008 |
| CN | 101827796 A | 9/2010 |
| CN | 102558501 A | 7/2012 |
| CN | 103206168 A | 7/2013 |
| CN | 105585256 A | 5/2016 |
| GB | 1 525 851 A | 9/1978 |
| JP | 47-005588 A | 3/1972 |
| JP | 63-297249 A | 12/1988 |
| JP | 02-048439 A | 2/1990 |
| JP | 2000-128584 A | 5/2000 |
| JP | 2005-529047 A | 9/2005 |
| JP | 2008-503424 A | 2/2008 |
| JP | 2010-538176 A | 12/2010 |
| JP | 2013-503269 A | 1/2013 |
| JP | 2019-073407 A | 5/2019 |

OTHER PUBLICATIONS

Official Communication issued in corresponding European Patent Application No. 20876580.0, mailed on Jan. 2, 2024.
Official Communication issued in International Patent Application No. PCT/JP2020/027629, mailed on Oct. 6, 2020.
Official Communication issued in corresponding Chinese Patent Application No. 202080057362.8, mailed on Nov. 1, 2022.
Lee et al., "Epoxy Resins", China Industrial Press 1st edition, Aug. 31, 1965, 2 pages.

* cited by examiner

[FIG. 1.]
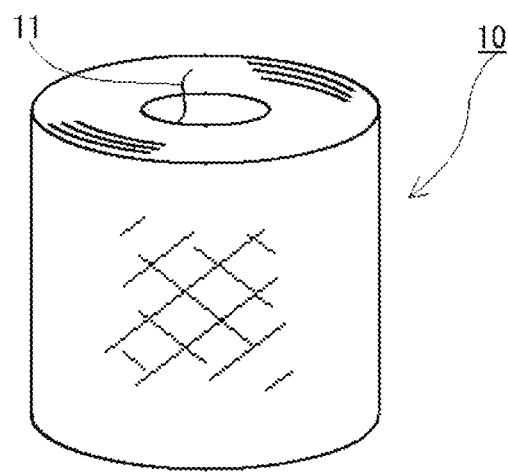
[FIG. 2.]
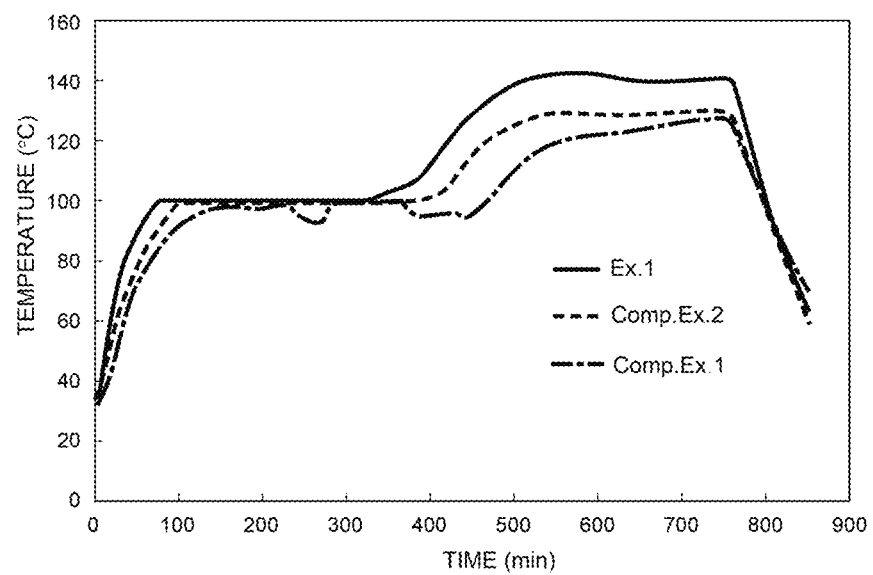

GLASS DIRECT ROVING PRODUCTION METHOD AND GLASS DIRECT ROVING

TECHNICAL FIELD

The present invention relates to a method for producing a glass direct roving formed by directly winding up a bundle of glass filaments and also relates to a glass direct roving.

BACKGROUND ART

A glass direct roving (DR) is known as a wound package formed by directly winding up a bundle of glass filaments. A glass strand drawn from the glass direct roving can be easily formed into a composite material together with resin by the pultrusion method, the filament winding method or so on and is therefore widely used as a reinforcing fiber for resin.

As a method for producing a glass direct roving, for example, there is a known method for producing a glass direct roving by drawing molten glass from a fiber forming apparatus, applying a sizing agent to the surfaces of hundreds to thousands of drawn glass filaments with an applicator, gathering the glass filaments into a bundle, winding up the bundle on a rotating collet while traversing the bundle, and drying the sizing agent to form a coating (see, for example, Patent Literature 1).

CITATION LIST

Patent Literature

PTL 1
JP-A-2005-529047

SUMMARY OF INVENTION

Technical Problem

However, such a glass direct roving as described in Patent Literature 1 may cause fuzzing on a glass strand or a decrease in lubricity of the glass strand in the process of combining the glass strand with a matrix resin to form a composite material, which leads to decrease in the workability. In addition, if the glass strand has poor spreadability, its ability to be impregnated with the matrix resin may decrease, which leads to decrease in the mechanical strength of the resultant composite. Because the glass direct roving is obtained by heat application in the thermal drying step, the sizing agent component needs to have excellent workability and strand spreadability with consideration of thermal drying.

An object of the present invention is to provide: a method for producing a glass direct roving that has excellent workability and can effectively increase the mechanical strength of a composite material obtained by combination with resin; and the glass direct roving.

Solution to Problem

A method for producing a glass direct roving according to the present invention is a method for producing a glass direct roving formed by directly winding up a bundle of glass filaments, and the method includes the steps of: applying a sizing agent containing an epoxy resin having an epoxy equivalent of 180 to 240 to surfaces of a plurality of glass filaments to bundle the plurality of glass filaments; winding up a bundle obtained by bundling the plurality of glass filaments, thus making a wound package; and thermally drying the sizing agent at a temperature of 135° C. to 155° C. to form a coating on the surfaces of the glass filaments.

In the present invention, the thermal drying of the sizing agent is preferably performed by hot-air drying.

In the present invention, a holding time at a temperature of 135° C. to 155° C. during the thermal drying is preferably three hours to five hours.

In the present invention, a monomer ratio of the epoxy resin after the thermal drying is preferably 35% to 55%.

In the present invention, a winding thickness of the bundle in the wound package is preferably 50 mm to 85 mm.

A glass direct roving according to the present invention is a glass direct roving formed by directly winding up a bundle of glass filaments and includes a glass strand including: a plurality of glass filaments; and a coating covering the surfaces of the glass filaments, wherein the coating contains an epoxy resin having a monomer ratio of 35% to 55% and a weight-average molecular weight Mw of 450 to 1100 in the coating.

In the present invention, a molecular weight distribution of the epoxy resin is preferably 1.5 to 2.2.

Advantageous Effects of Invention

The present invention enables provision of: a method for producing a glass direct roving that has excellent workability and can effectively increase the mechanical strength of a composite material obtained by combination with resin; and the glass direct roving.

BRIEF DESCRIPTION OF DRAWINGS

FIG. 1 is a schematic perspective view showing a glass direct roving according to one embodiment of the present invention.

FIG. 2 is a graph showing the internal temperatures of glass direct rovings during thermal drying in an example and comparative examples.

DESCRIPTION OF EMBODIMENTS

Hereinafter, a description will be given of a preferred embodiment. However, the following embodiment is simply illustrative and the present invention is not limited to the following embodiment. Throughout the drawings, members having substantially the same functions may be referred to by the same reference characters.

(Production Method of Glass Direct Roving)

A method for producing a glass direct roving according to the present invention is a method for producing a glass direct roving formed by directly winding up a bundle of glass filaments.

The method for producing a glass direct roving according to the present invention includes the steps of: applying a sizing agent containing an epoxy resin having an epoxy equivalent of 180 to 240 to surfaces of a plurality of glass filaments to bundle the plurality of glass filaments; winding up a bundle obtained by bundling the plurality of glass filaments, thus making a wound package; and thermally drying the sizing agent at a temperature of 135° C. to 155° C. to form a coating on the surfaces of the glass filaments.

More specifically stated, first, a glass raw material injected into a glass melting furnace is melted to form molten glass. The molten glass is made homogeneous and then extruded from thermally resistant nozzles attached to a bushing. Thereafter, the extruded molten glass is cooled to form a plurality of glass filaments (monofilaments). For example, a platinum-made bushing can be used as the bushing.

The composition of the glass filaments is not particularly limited and, for example, E-glass, S-glass, D-glass, AR-glass or the like can be used. Among these glasses, E-glass is preferred because it is inexpensive and can further increase the mechanical strength of a composite material obtained by combining it with resin. Furthermore, S-glass is also preferred because it can still further increase the mechanical strength of a composite material.

The number of glass filaments is not particularly limited, but it is preferably not less than 800 and not more than 10000, more preferably not more than 6000, and still more preferably not more than 4000. When the number of glass filaments is equal to or greater than the above lower limit, the mechanical strength of a composite material obtained by combination with resin can be further increased. Furthermore, when the number of glass filaments is equal to or smaller than the above upper limit, the glass filaments can be more easily made uniform in length.

The fiber diameter of the glass filaments is preferably not less than 6 μm and not more than 24 μm, more preferably not more than 20 μm, and still more preferably not more than 17 μm. When the fiber diameter of the glass filaments is in the above range, the mechanical strength of a composite material obtained by combination with resin can be further increased. The fiber diameter of the glass filaments can be adjusted by changing, for example, the viscosity of molten glass or the winding speed during wind-up.

Next, a sizing agent is applied to the surfaces of the obtained plurality of glass filaments. With the sizing agent applied uniformly to the glass filaments, the plurality of glass filaments are doubled and gathered in units of hundreds to thousands. The plurality of glass filaments can be doubled and gathered, for example, by a gathering shoe.

The sizing agent contains an epoxy resin. The epoxy equivalent of the epoxy resin is 180 to 240. The epoxy resin is preferably a liquid epoxy resin. However, the epoxy resin is sufficient to have an epoxy equivalent in the above range and the other characteristics are not particularly limited.

Any epoxy resin having an epoxy equivalent in the above range can react its epoxy groups with other sizing agent components during thermal drying to increase the molecular weight.

The epoxy equivalent of the epoxy resin is preferably not less than 180 and not more than 240. The epoxy resin having an epoxy equivalent in this range is in liquid form at ordinary temperatures and pressures. Since the epoxy resin is in liquid form, it can be easily emulsified and is therefore suitable for use in a glass fiber sizing agent. This type of epoxy resin increases the molecular weight by chemical reaction due to heating in the drying step, thus forming an optimum coating for the workability and spreadability in the process of forming a composite material. If the epoxy equivalent is too small, it takes much time in the drying step and the epoxy resin is likely to become discolored and deteriorated. On the other hand, if the epoxy equivalent is too large, the number of functional groups reactable with the matrix resin is reduced, which leads to decrease in the mechanical strength of the reinforcing material. If the molecular weight of the epoxy resin after the thermal drying is too small, the glass filaments may fuzz in the process of combining the glass strand with the matrix resin to form a composite material. In addition, the resultant glass direct roving may be sticky and decrease the lubricity. Therefore, if the molecular weight of the epoxy resin after the thermal drying is too small, the workability of the glass direct roving may decrease. On the other hand, if the molecular weight of the epoxy resin after the thermal drying is too large, the glass direct roving after being dried may become hardened to decrease the spreadability of the glass strand. Therefore, the ability of the glass strand to be impregnated with the matrix resin may decrease, which leads to decrease in the mechanical strength of the resultant composite.

The type of epoxy resin is not particularly limited and examples that can be used include bisphenol A epoxy resin, biphenyl bifunctional epoxy resin, biphenyl-modified novolac epoxy resin, bisphenol F epoxy resin, naphthol-cresol-copolymerized novolac epoxy resin, naphthol-phenol-copolymerized novolac epoxy resin, dicyclopentadiene-phenol addition-curing epoxy resin, triphenylmethane epoxy resin, phenol novolac epoxy resin, cresol novolac epoxy resin, tetraphenylethane epoxy resin, and naphthol novolac epoxy resin. These epoxy resins may be used singly or in combination of two or more of them. A preferred example among them is bisphenol A epoxy resin from the viewpoint of further increasing the integrity of the glass strand.

Although the content of epoxy resin in the sizing agent is not particularly limited, the content thereof is, of the total dry solid content, preferably not less than 70% by mass, more preferably not less than 75% by mass, preferably not more than 95% by mass, and more preferably not more than 90% by mass. When the content of epoxy resin in the sizing agent is in the above range, the mechanical strength of a composite material obtained by combining the glass strand with resin can be more effectively increased.

The sizing agent may contain, in addition to epoxy resin, for example, a silane coupling agent. Specific examples of the silane coupling agent that can be used include aminosilane, epoxysilane, vinylsilane, acrylic silane, chlorosilane, mercaptosilane, and ureidosilane. By the addition of the silane coupling agent, the mechanical strength of a composite material obtained by combining the glass strand with resin can be still more effectively increased. The sizing agent may further contain, besides the above-described silane coupling agent, a cationic lubricant, a non-ionic surfactant, a defoamer, an antistat, a binder, such as urethane resin, polyamide resin or acetic anhydride copolymer, and/or other components, wherein the compounding ratio of each component can be determined as appropriate.

The amount of sizing agent applied is preferably controlled so that the ignition loss of the obtained glass strand is 0.5% by mass to 2.0% by mass. The ignition loss can be measured in accordance with JIS R3420 (2013).

Next, a bundle obtained by gathering a plurality of glass filaments is wound up, for example, on a rotating collet while traversing the bundle, thus making a wound package. As the collet for use in winding up the bundle, for example, a collet with a diameter of 140 mm to 250 mm can be used. The diameter of the collet is preferably not more than 230 mm and more preferably not more than 200 mm.

The winding thickness of the bundle in the wound package is preferably not less than 50 mm and not more than 85 mm. When the winding thickness of the bundle in the wound package is in the above range, the bundle can be more evenly thermally dried from its winding start portion to winding end portion.

Next, the sizing agent is thermally dried at a temperature of 135° C. to 155° C. to form a coating on the surfaces of the glass filaments. Thus, a glass direct roving according to the present invention can be obtained.

The temperature of the thermal drying is preferably not lower than 140° C. and not higher than 145° C. When the temperature of the thermal drying is equal to or higher than the above lower limit, the molecular weight of epoxy resin after the thermal drying can be in a suitable range, which leads to increase in the mechanical strength of a composite material obtained by combination with resin effectively. Furthermore, when the temperature of the thermal drying is equal to or lower than the above upper limit, coloration due to thermal degradation can be further prevented.

The time of thermal drying held at the above temperature is preferably not less than 3 hours, more preferably not less than 3.5 hours, preferably not more than 5 hours, and more preferably not more than 4.5 hours. When the time of thermal drying is equal to or greater than the above lower limit, the molecular weight of epoxy resin after the thermal drying can be in a suitable range, which leads to an effective enhancement of the mechanical strength of a composite material obtained by combination with resin. Furthermore, when the time of thermal drying is equal to or lower than the above upper limit, coloration due to thermal degradation can be further prevented.

The method for thermally drying the sizing agent is not particularly limited, but, for example, a method of hot-air drying the wound package at a temperature of 135° C. to 155° C. or a method of dielectrically drying the wound package at that temperature can be used. In particular, it is preferred to thermally dry the sizing agent by hot-air drying the wound package at a temperature of 135° C. to 155° C. In this case, the bundle can be more evenly thermally dried from its winding start portion to winding end portion. Hot-air drying is preferred because it is easier and more certain to keep the sizing agent at a temperature of 135° C. to 155° C. In the case of dielectric drying, it is difficult to keep the temperature after water is removed, so that it may become difficult to form a suitable coating.

Since in the present invention, the sizing agent containing an epoxy resin having an epoxy equivalent of 180 to 240 is thermally dried at a temperature of 135° C. to 155° C., the molecular weight of the epoxy resin can be adjusted to a more suitable range. As a result, the workability can be increased and, in addition, the mechanical strength of a composite material obtained by combination with resin can be more effectively increased.

The glass direct roving produced as above includes a glass strand wound up in a coiled form, is stored in this form, and can be used as necessary. For the purposes of dust prevention, antifouling, protection of fiber surfaces, and so on, the glass direct roving including a glass strand wound up in a coiled form is stored in a state wrapped depending on the intended use with an organic film material, for example, shrink wrapped or wrapped with stretch film. The glass direct rovings may be stored in a multiply stacked state.

(Glass Direct Roving)

FIG. 1 is a schematic perspective view showing a glass direct roving according to one embodiment of the present invention. As shown in FIG. 1, a glass direct roving 10 is formed so that a glass strand 11 is wound up. More specifically, the glass direct roving 10 has a cylindrical structure in which a glass strand 11 is wound layer upon layer.

The inside diameter of the glass direct roving 10 may be, for example, in a range of 140 mm to 250 mm. On the other hand, the outside diameter of the glass direct roving 10 may be, for example, in a range of 260 mm to 315 mm.

The glass strand 11 includes a plurality of glass filaments and a coating covering the surfaces of the glass filaments. The glass strand 11 is formed, as previously described in the chapter about the production method, by thermally drying a bundle obtained by bundling a plurality of glass filaments with a sizing agent. Therefore, the coating is made of the same components as the sizing agent described above.

The weight-average molecular weight of the epoxy resin in the coating is not less than 450 and not more than 1100 and preferably not less than 500 and not more than 800. When the molecular weight of the epoxy resin is equal to or greater than the above lower limit, this can further reduce fuzzing on the glass strand and the decrease in lubricity in the process of combining the glass strand with a matrix resin to form a composite material, which leads to increase in the workability of the glass direct roving 10 further. Furthermore, when the molecular weight of the epoxy resin is equal to or smaller than the above upper limit, the spreadability of the glass strand 11 can be further increased. Therefore, in producing a composite material with resin, the ability to be impregnated with resin can be further increased, which leads to an effective enhancement of the mechanical strength of the composite material.

The molecular weight distribution of the epoxy resin in the coating is preferably not less than 1.5, more preferably not less than 1.6, preferably not more than 2.2, and more preferably not more than 2.0. When the molecular weight distribution of the epoxy resin is equal to or greater than the above lower limit, this can further reduce fuzzing on the glass strand and the decrease in lubricity in the process of combining the glass strand with a matrix resin to form a composite material, which leads to increase in the workability of the glass direct roving 10. Furthermore, when the molecular weight distribution of the epoxy resin is equal to or smaller than the above upper limit, the spreadability of the glass strand 11 can be further increased. Therefore, in producing a composite material with resin, the ability to be impregnated with resin can be further increased, which leads to an effective enhancement of the mechanical strength of the composite material.

Herein, the molecular weight of the epoxy resin is a weight-average molecular weight (Mw) in polystyrene equivalent measured by gel permeation chromatography (GPC). The molecular weight distribution of the epoxy resin can be determined from (weight-average molecular weight)/ (number average molecular weight) (Mw/Mn).

The monomer ratio of the epoxy resin in the coating is preferably not less than 35%, more preferably not less than 40%, preferably not more than 55%, and more preferably not more than 50%. When the monomer ratio of the epoxy resin is equal to or greater than the above lower limit, the spreadability of the glass strand 11 can be further increased. Therefore, in producing a composite material with resin, the ability to be impregnated with resin can be further increased, which leads to an effective enhancement of the mechanical strength of the composite material. Furthermore, when the monomer ratio of the epoxy resin is equal to or smaller than the above upper limit, this can further reduce fuzzing on the glass strand and the decrease in lubricity in the process of combining the glass strand with a matrix resin to form a composite material, which leads to increase in the workability of the glass direct roving 10 further. The monomer ratio can also be determined by GPC.

Although the count of the glass strand 11 is not particularly limited, it is preferably not less than 600 tex, more preferably not less than 1200 tex, preferably not more than 4800 tex, and more preferably not more than 3000 tex. When the count of the glass strand 11 is equal to or greater than the above lower limit, breakage of the glass strand 11 in producing a composite material with resin can be further reduced. When the count of the glass strand 11 is equal to or smaller than the above upper limit, the mechanical strength of a composite material obtained by combining it with resin can be more effectively increased.

The glass direct roving 10 can be produced into a composite material with resin by the pultrusion method, the filament winding method or so on and can be suitably used as a reinforcing material for resin.

The present invention will be described below in further detail with reference to specific examples. The present invention is not at all limited by the following examples and modifications and variations may be appropriately made therein without changing the gist of the invention.

EXAMPLE 1

First, a sizing agent was prepared by homogeneously mixing, relative to the total amount of the sizing agent, 15.0% by mass epoxy resin emulsion (EPI-REZ resin 3514-W-56 manufactured by Hexion Inc., epoxy equivalent: 185 to 192), 0.6% by mass epoxysilane (KBM-403) as a silane coupling agent, 0.2% by mass stearic acid-tetraethylenepentamine condensate as a cationic lubricant, and 0.0001% by mass defoamer (TSA730), in ion-exchange water.

Next, molten glass was extruded from a bushing having several hundreds to several thousands of nozzles to give a composition of E-glass, thus obtaining glass filaments.

Next, the previously prepared sizing agent described above was applied to the surfaces of the obtained glass filaments using an applicator controlled to give an ignition loss of 0.6% by mass, these glass filaments were gathered, and the obtained bundle was wound up on a collet with a diameter of 150 mm to produce a wound package. Subsequently, the produced wound package was thermally dried in a hot-air drying oven at 145° C. for 750 minutes, thus obtaining a glass direct roving. The size of the obtained glass direct roving was a weight of 18 kg, a winding height of 250 mm, an inside diameter of 150 mm, and an outside diameter of 275 mm. The count of the glass strand was 2400 tex.

EXAMPLE 2

A glass direct roving was obtained in the same manner as in Example 1 except that W2801 (epoxy equivalent: 190 to 205) manufactured by Mitsubishi Chemical Corporation was used as an epoxy resin emulsion.

COMPARATIVE EXAMPLE 1

A glass direct roving was obtained in the same manner as in Example 1 except that the temperature during thermal drying of the wound package was 125° C.

COMPARATIVE EXAMPLE 2

A glass direct roving was obtained in the same manner as in Example 1 except that the temperature during thermal drying of the wound package was 130° C.

COMPARATIVE EXAMPLE 3

A glass direct roving was obtained in the same manner as in Example 1 except that EPI-REZ resin 3522-W-60 (epoxy equivalent: 615 to 715) manufactured by Hexion Inc. was used as an epoxy resin emulsion.

FIG. 2 is a graph showing the internal temperatures of glass direct rovings during thermal drying in Example 1 and Comparative Examples 1 and 2. In measuring the internal temperature, the winding thickness of the bundle in the wound package was 125 mm. The internal temperature was continuously measured, with a thermocouple inserted 10 cm from the end surface into the central portion of the wound package, in the drying oven. It can be seen from FIG. 2 that after water evaporated, the internal temperature increased to near the set hot air temperature. It can also be seen that the time during which the internal temperature had increased to near the set hot air temperature was four to five hours. It was confirmed that also in Example 2 the time during which the internal temperature had increased to near the set hot air temperature was four to five hours.

[Evaluations]

(Monomer Ratio and Weight-Average Molecular Weight After Drying)

The monomer ratio after drying was determined by extracting a coating component of each of the glass direct rovings obtained in the examples and comparative examples with tetrahydrofuran and measuring the molecular weight of the coating component by gel permeation chromatography (GPC). Likewise, the weight-average molecular weight after drying was determined by gel permeation chromatography (GPC). The measurement by gel permeation chromatography (GPC) was performed under the following conditions.

Column: Chrompack Microgel 5, 500 Angstrom, 50 cm column
Solvent: THF
Flow rate: 1000 ml/min
Wavelength of UV detector: 272 nm (Fuzz Under Tension)

A glass strand drawn from each of the glass direct rovings was traveled 1500 m at 300 m/min while a tension was applied thereto using a tension bar and the mass of glass filaments deposited under the tension bar was measured.

(Tensile Strength)

A glass strand was drawn from each of the glass direct rovings obtained in the examples and comparative examples and kneaded with epoxy resin in the method conforming to ASTM D2344, thus obtaining a composite material. The glass strand was added into the resin to reach a content of 70% by mass in the composite material. The tensile strength of the composite material (Composite Material Strength) was measured with a bending tester manufactured by Shimadzu Corporation. The flexural strength of the composite material was measured in conformity with ASTM D2344.

The results are shown in Table 1 below.

TABLE 1

|  | Example 1 | Example 2 | Comp. Ex. 1 | Comp. Ex. 2 | Comp. Ex. 3 |
| --- | --- | --- | --- | --- | --- |
| Epoxy Equivalent of Epoxy Resin in Sizing Agent | 185 | 200 | 185 | 185 | 665 |
| Set Hot Air Temperature | 145° C. | 145° C. | 125° C. | 130° C. | 130° C. |

TABLE 1-continued

|  | Example 1 | Example 2 | Comp. Ex. 1 | Comp. Ex. 2 | Comp. Ex. 3 |
|---|---|---|---|---|---|
| Total Drying Time | 750 min. | 750 min. | 750 min. | 750 min. | 750 min. |
| Time During Which Roving Temp Has Reached 140° C. or Higher (hours) | 5 | 5 | 0 | 0 | 0 |
| Monomer Ratio After Drying | 43% | 48% | 58% | 57% | 57% |
| Weight-Average Molecular Weight After Drying | 540 | 680 | 435 | 460 | 1600 |
| Fuzz Under Tension | 8 mg | 3 mg | 15 mg | 17 mg | 22 mg |
| Composite Material Strength ASTM D2344 | 72 MPa | 73 MPa | 68 MPa | 66 MPa | 66 MPa |

It can be seen from Table 1 that the monomer ratio after drying was lowest after drying at 145° C. in Example 1, in which case the reaction of liquid epoxy resin was most accelerated. Furthermore, it can be seen that, as a result, the amount of fuzz under tension in Example 1 was small and the composite material in Example 1 had excellent tensile strength. Example 2 also exhibited good results of a small amount of fuzz under tension and a high tensile strength of the composite material.

REFERENCE SIGNS LIST

10 . . . glass direct roving
11 . . . glass strand

The invention claimed is:

1. A glass direct roving formed by directly winding up a bundle of glass filaments,
   the glass direct roving comprising a glass strand including: a plurality of glass filaments; and a dry coating of sizing agent covering the surfaces of the glass filaments,
   wherein the coating contains an epoxy resin having an epoxy monomer ratio of 35% to 55% and a weight-average molecular weight Mw of 450 to 1100.

2. The glass direct roving according to claim 1, wherein a molecular weight distribution of the epoxy resin is 1.5 to 2.2.

* * * * *